Patented Feb. 17, 1931

1,792,648

UNITED STATES PATENT OFFICE

HERBERT A. LUBS AND JOSEPH G. DINWIDDIE, OF PENNS GROVE, NEW JERSEY, ASSIGNORS TO E. I. DU PONT DE NEMOURS & COMPANY, OF WILMINGTON, DELAWARE, A CORPORATION OF DELAWARE.

INDIGOID-VIOLET VAT DYESTUFFS

No Drawing.   Application filed March 29, 1927.   Serial No. 179,392.

This invention relates to the production of violet vat dyestuffs by the condensation of a halo-isatin chloride with the various hydroxy-alkyl-thionaphthenes, and particularly of dibrom isatin chloride or mono-chlor isatin chloride with 3-hydroxy-4-chloro-6-methyl-thionaphthene, or 3-hydroxy-5-chloro-7-methyl-thionaphthene. The graphic representation of these particular thionaphthenes is probably as follows:—

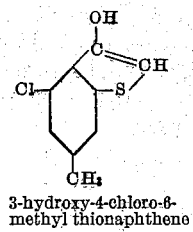 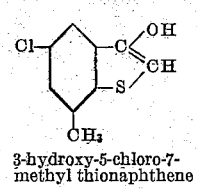

3-hydroxy-4-chloro-6-methyl thionaphthene    3-hydroxy-5-chloro-7-methyl thionaphthene The dyestuffs so produced are considerably superior in brightness, shade and tinctorial value to those made by condensation of hydroxy thionaphthene with isatin chloride, and subsequently brominating this condensation product. By varying the particular combination of intermediates, shades of violet may be obtained varying from reddish to bluish, and having most probably the following formula:—

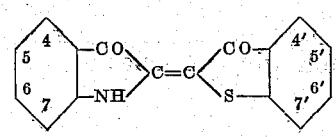

in which one or more of the positions 4, 5, 6 and 7 are occupied by halogen, one of the positions 4', 5', 6', and 7' by an alkyl group as the methyl group, and one of the positions 4', 5', and 7' by halogen, or in which one or more of the positions 5', 6', 7' is occupied by an alkyl group as the methyl group and one of the remaining positions 4', 5', 6' and 7' by halogen.

Many of the new compounds are violet vat dyestuffs of the 2-thionaphthene-2-indol-indigo series corresponding to the general formula:

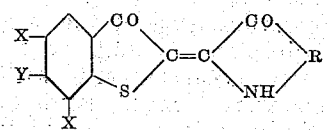

wherein X means a halogen or alkyl group, Y means hydrogen, which may be substituted by a halogen or an alkyl group and R means a halogenated arylresidue, which are when dry, violet powders, soluble in cold concentrated sulfuric acid to a greenish to bluish, in warm concentrated sulfuric acid to a bluish green solution, which are separated therefrom by water in violet flakes, yielding with alkaline hydrosulfite a yellow to orange vat, from which cotton and wool is dyed in full violet to bluish shades of an excellent fastness especially to light, which dyestuffs are substantially identical with dyestuffs obtainable from oxy-thionaphthene derivatives, corresponding probably to the general formula:—

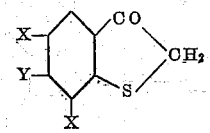

wherein X means a halogen or an alkyl group, Y means hydrogen, which may be substituted by a halogen or an alkyl group, by condensing them with an α-isatin body of the general formula:—

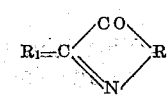

wherein R means a halogenated arylresidue, $R_1$ a halogen, or an arylido group.

Our invention may be illustrated by the following specific examples:

*Example I.*—Heat under reflux with monochlor-benzene, or another suitable inert solvent, 10.35 parts of dibromisatin together with a slight excess of phosphorous pentachloride (for example, with 8.52 parts of the commercial product) until a clear red brown solution is obtained. This solution is mixed with good stirring for at least five minutes with a solution, in an inert solvent, such as benzene, of the molecularly equivalent amount of 3-hydroxy-5-chloro-7-methyl-thionaphthene. When sufficient time, say half an hour, has elapsed to insure that the reaction is completed, the dyestuff is filtered off, washed with a solvent such as benzene, then with alcohol and finally dried in an oven at 50-60° C. The dyestuff in powder form has a brilliant red-blue or violet shade; it may be used in the form of powder or may be made into a paste for greater ease in dissolving. Said dyestuff dyes cotton from a yellow orange hydrosulfite vat a bright, full shade of violet of very good fastness to light, washing, chlorine, etc.

The temperature at which the reaction between the dibromisatin and the thionaphthene derivative is carried on is, within wide limits, immaterial. The dyestuff has been made with the benzene solution of 3-hydroxy-5-chloro-7-methyl-thionaphthene at room temperature, 20° C., and the dibromisatin chloride solution in chlorbenzene varying from room temperature to the boiling point of monochlor-benzene, which is 132° C.

In the condensation of dibromisatin with phosphorous pentachloride, hydrochloric acid is split off, as is also the case during the condensation of the dibromisatin-chloride with 3-hydroxy-5-chloro-7-methyl thionaphthene. The reactions which occur are probably as follows:—

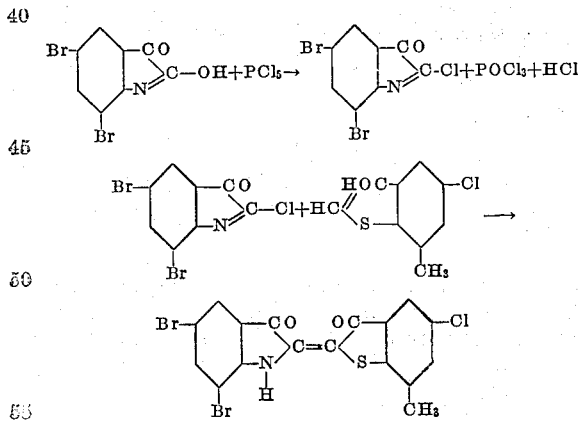

*Example II.*—When the reaction is carried out exactly as in Example I, except that 3-hydroxy-4-chloro-6-methyl-thionaphthene is substituted for 3-hydroxy-5-chloro-7-methyl derivative, a similar dye, but of a somewhat redder shade is obtained.

*Example III.*—By condensing with dibromisatin chloride, one molecular equivalent of the oxy-thionaphthene obtained by the action of phosphorous trichloride on 3-chloro-4-methyl-phenyl-thioglycollic acid and subsequent ring closure by means of anhydrous aluminum chloride, a fast violet vat dyestuff is also produced. The procedure is the same as described in Example I.

*Example IV.*—6.2 parts of 5-chlor-isatin are transformed into the chloride and condensed with a molecular equivalent of 3-hydroxy-4-chloro-6-methyl-thionaphthene as described in Example I and isolated in the same manner. There is thus produced a bright violet vat dye of a somewhat redder shade than when dibromisatin is used as the first component.

Although in the above examples certain specific conditions of operation have been mentioned, it will be understood that our invention is not limited thereto, but that the process may be modified in various ways within the scope of the following claims, without departing from the spirit or conception of our invention. For example, it is obvious than an α-arylido isatin may be employed instead of an isatin chloride.

The new dyestuffs above described are chiefly useful in the dyeing of cotton, but they may also be used to advantage in the dyeing of wool and silk.

We claim:

1. As a new composition of matter, the product obtainable by condensing a halogenated isatin chloride with a hydroxy-methyl-chlor-thionaphthene, and having most probably the following formula:

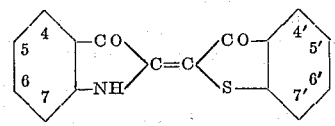

in which one or more of the positions 4, 5, 6 and 7 are occupied by halogen, at least one of the positions 5' and 6', by the methyl group, and at least the remaining position 4', by halogen.

2. As a new composition of matter, the product obtainable by condensing a halogenated isatin chloride with a hydroxy-methyl-chlor-thionaphthene, and having most probably the following formula:

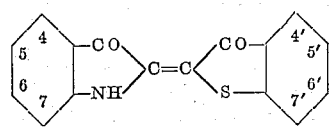

in which one or more of the positions 4, 5, 6 and 7 are occupied by halogen, one of the positions 5' and 6' by the methyl group, and the position 4' by halogen.

3. As a new composition of matter, the product obtainable by condensing an isatin chloride with a hydroxy-methyl-chlor-thionaphthene, and having most probably the following formula:

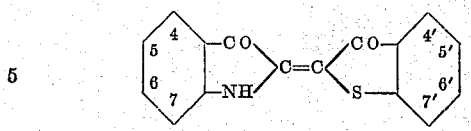

in which at least two of the positions 4, 5, 6 and 7 are occupied by halogen, one of the positions 5' and 6', by the methyl group, and the position 4' by halogen.

4. As a new composition of matter, the product obtainable by condensing 5:7-dibromisatin chloride with a hydroxyl-methyl-chlor-thionaphthene, and having most probably the following formula:

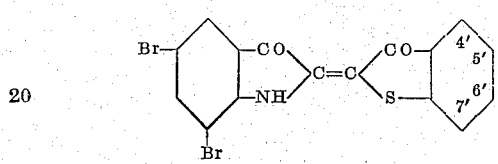

in which one of the positions 5' and 6' is occupied by the methyl group and the position 4' by halogen.

5. Textile material dyed with the dyestuff set forth in claim 1.

6. Textile material dyed with the dyestuff set forth in claim 3.

7. As new compounds, dyestuffs of the following formula:

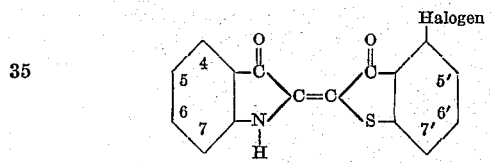

in which one or more of the positions 4, 5, 6 and 7 are occupied by halogen and in which the thionaphthene radical is mono-halogen-mono-alkyl substituted, the alkyl group occupying one of the positions 5', 6' and 7'.

8. As new compounds, dyestuffs of the following formula:

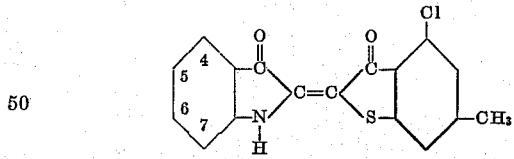

in which one or more of the positions 4, 5, 6 and 7 are occupied by halogen.

9. The compounds resulting from reacting an isatin chloride of the probable formula

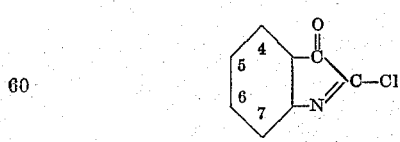

in which one or more of the positions 4, 5, 6, and 7 are occupied by halogen, with a hydroxy thionaphthene obtainable by ring closure of 3-chloro-4-methyl-phenyl-thioglycollic acid with anhydrous aluminum chloride.

10. The compounds resulting from reacting an isatin chloride of the probable formula

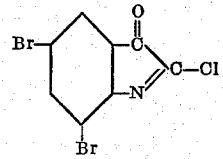

with a hydroxy thionaphthene obtainable by ring closure of 3-chloro-4-methyl-phenyl-thioglycollic acid with anhydrous aluminum chloride.

In testimony whereof we affix our signatures.

HERBERT A. LUBS.
JOSEPH G. DINWIDDIE.